(12) United States Patent
Winbow et al.

(10) Patent No.: US 7,095,678 B2
(45) Date of Patent: Aug. 22, 2006

(54) METHOD FOR SEISMIC IMAGING IN GEOLOGICALLY COMPLEX FORMATIONS

(75) Inventors: Graham A. Winbow, Houston, TX (US); Thomas Edward Clee, Chappell Hill, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 320 days.

(21) Appl. No.: 10/989,204

(22) Filed: Nov. 15, 2004

(65) Prior Publication Data

US 2005/0143921 A1 Jun. 30, 2005

Related U.S. Application Data

(60) Provisional application No. 60/529,272, filed on Dec. 12, 2003.

(51) Int. Cl.
*G01V 1/28* (2006.01)
(52) U.S. Cl. .............................. 367/73; 367/38; 702/16
(58) Field of Classification Search ................. 367/73, 367/38, 50, 58; 702/16
See application file for complete search history.

(56) References Cited

U.S. PATENT DOCUMENTS

| | | | |
|---|---|---|---|
| 5,657,223 A | 8/1997 | Juszczak et al. | 364/421 |
| 5,991,695 A * | 11/1999 | Wang et al. | 702/14 |
| 6,002,642 A | 12/1999 | Krebs | 367/73 |
| 6,446,007 B1 * | 9/2002 | Finn et al. | 702/14 |
| 6,832,160 B1 * | 12/2004 | Vinje | 702/14 |
| 2004/0022127 A1 * | 2/2004 | Faichney et al. | 367/73 |

FOREIGN PATENT DOCUMENTS

WO WO 01/98798 12/2001

OTHER PUBLICATIONS

Bulant, Petr. "Calculation of Multivalued Ray Theory Travel Times in 3-D Structures." Thesis, 1997.*
Bulant, Petr. "Two-Point Ray Tracing in 3-D heterogeneous Block Structures." Department of Geophysics, Charles University.*
Chapman and Drummond (1982) "Body-Wave Seismograms in Inhomogeneous Media Using Maslov Asymptotic Theory", *Bulletin of the Seismological Society of America*, 72, pp. S277-S317.
Claerbout (1976) *Fundamentals of Geophysical Data Processing*, McGraww-Hill.
Gray (1992) "Frequency-Selective Design of the Kirchhoff Migration Operator", *Geophysical Prospecting*, 40, pp. 565-571.
Koren and Kosloff (2001) "Common Reflection Angle Migration" *Journal of Seismic Exploration*, 10, pp. 41-57.
Schleicher et al. (1993) "3-D True-Amplitude Finite-Offset Migration", *Geophysics*, 58, pp. 1112-1126.

(Continued)

*Primary Examiner*—Bernarr E. Gregory
*Assistant Examiner*—Scott A. Hughes
(74) *Attorney, Agent, or Firm*—ExxonMobil Upstream Research Company Law Department (57) ABSTRACT

A method for multipath imaging of three-dimensional volumes of seismic data, given the subsurface velocity distribution. Ray tracing is used to generate the volumes of information needed for migration, but using coarse-scaled grids for computational efficiency. Interpolation methods are disclosed that address the specific shot points and receiver locations and that enable a final image on a grid with the desired resolution. Data storage and retrieval techniques are also disclosed.

25 Claims, 8 Drawing Sheets
(2 of 8 Drawing Sheet(s) Filed in Color)

OTHER PUBLICATIONS

Xu et al. (2001) "Common-Angle Migration: A Strategy for Imaging Complex Media", *Geophysics*, 66, pp. 1877-1894.

Xu et al. (2004) "Fast Migration/Inversion with Mulivalued Rayfields: Part 1-Method, Validation Test, and Application in 2D to Marmousi", *Geophysics*, 69, pp. 1311-1319.

Xu et al. (2004) "Fast Migration/Inversion with Mulivalued Rayfields: Part 2-Applications to the 3D SEG/EAGE Sale Model", *Geophysics*, 69, pp. 1320-1328.

EP Search Report No. RS 110748US dated Aug. 10, 2004, 3 pages.

*NORSAR 2D Ray Modeling* [online] Oct. 2002, XP002288040 at www.norsar.com, 12 pages.

"NORSAR Now Introduces a Large Step Forward in 3D Seismic Illumination: Simulated Migration Amplitude (SMA)" *NORSAR Seismic Modeling News*, [online] Oct. 2002, at www.norsar.com, 2 pages.

\* cited by examiner

METHOD FOR SEISMIC IMAGING IN GEOLOGICALLY COMPLEX FORMATIONS

This application claims the benefit of U.S. Provisional Application No. 60/529,272, filed Dec. 12, 2003.

FIELD OF THE INVENTION

This invention relates generally to the field of geophysical prospecting and, more particularly, to seismic data processing. Specifically, the invention is a method for seismic imaging in geologically complex formations.

BACKGROUND OF THE INVENTION

Examples of such geology occur in the Gulf of Mexico adjacent to or under salt bodies, in offshore Angola adjacent to or under salt, or in complex overthrust formations such as found in the foothills of the Canadian Rockies or the Andes of Venezuela. When imaging in such complex formations one of the basic problems is that seismic energy may reach each image point from source or receiver by a variety of raypaths. This phenomenon is referred to as "multipathing". Current methods proposed to deal with multipath imaging are slow and expensive, and therefore impractical for widespread application to 3-D imaging using present computer technology.

Most conventional imaging methods assume there is only one path connecting the source, image point and receiver. This is true whenever the subsurface velocity behaves in a sufficiently simple manner, for example when it is controlled mostly by compaction and varies mainly in a vertical direction but only slowly in a lateral direction.

Attempts to deal with multipath imaging fall into three classes:

(a) Kirchhoff Common Offset Depth Migration

In this approach the seismic data is assembled into common offset (source-receiver distance) bins and migrated using a single preferred ray path connecting source to image point to receiver. When there are many possible ray paths, a single path is selected, often the path having the strongest amplitude, first arrival or some other preselected criterion. This imaging method is satisfactory whenever lateral velocity variation is not strong. However, multipathing is a significant effect in subsalt imaging, and many ray paths may have comparable weight in the image. Thus it often occurs that Kirchhoff migration is unable to image subsalt reflectors satisfactorily. In addition, it is inconvenient to correct Kirchhoff images for spherical divergence since this requires the relatively expensive computation of the Beylkin determinant. The theory of how to correct Kirchhoff amplitudes for spherical divergence is explained in Schleicher et al., "3-D True-Amplitude Finite-Offset Migration", *Geophysics* 58, 1112–1126 (1993). Thus, Kirchhoff amplitudes are often less useful for subsequent data interpretation.

(b) Wave Equation Migration (WEM)

WEM is a more ambitious method of imaging. In a typical approach the data recorded at all the receivers for a given shot point are back-propagated using the wave equation. Energy from the shot is forward-propagated using the wave equation, and the two wave fields are cross-correlated thus producing an image as described by Claerbout in *Fundamentals of Geophysical Data Processing*, McGraw-Hill (1976). One difficulty with this approach is that the answers generally do not preserve seismic amplitude and therefore the resulting image cannot be directly interpreted for amplitude. This is a significant problem for the seismic interpreter because amplitudes convey information about reflection coefficients, and hence about subsurface rock properties.

Another problem with WEM is that downward wave continuation is computationally expensive. In addition the wave fields have to be computed for all of the locations downward from the source and receiver, including locations of no interest for the final image: it is difficult in WEM to use "target-oriented imaging". (Both the Kirchhoff method and the below-described CRAM method can operate in target-oriented mode.) Thus WEM generally requires large computer resources and still takes a long time to produce a result.

(c) Common Reflection Angle Migration (CRAM)

In this approach the data are migrated into common reflection angle bins. Because rays are uniquely determined by their takeoff angle and starting point in space, CRAM enables all rays connecting source, image point, and receiver to be added into the image. In principle CRAM combines much or most of the imaging power of WEM with the relative economy of Kirchhoff migration. Xu et al. ("Common-angle migration: A strategy for imaging complex media", *Geophysics* 66, 1877–1894 (2001)) describe theoretical aspects of CRAM in some detail. The method described by the authors does preserve seismic amplitude through amplitude weighting of the migrated traces. However they do not describe a computational method that is practical for application to typically sized 3-D data sets.

Koren and Kosloff ("Common reflection angle migration", *Journal of Seismic Exploration* 10, 41–57 (2001)) describe an approach to CRAM. Their method proceeds image point by image point. From each image point, rays are shot up to the surface. The migrated trace added into the image is that acquired at the source and receiver locations so found. This means that the seismic data has to be read in what amounts to random order from the disk. Such a computational approach is inefficient and is only practical for 2-D imaging. However in operational practice, and especially in complex geology, one generally requires true 3-D images.

As a consequence of the limitations of the above methods, there remains a need for a method of subsalt imaging (or imaging other complex formations) that is computationally affordable and is able to provide multipath imaging in 3-D space. The present inventive method satisfies this need.

SUMMARY OF THE INVENTION

The invention is a computer-assisted method that properly accounts for ray multipathing in imaging large volumes of seismic data such as three-dimensional data volumes acquired from complex geologic formations. The method requires a velocity distribution in the subsurface and seismic input data collected with sources and receivers at known locations. In one embodiment of the invention, ray map data files are computed, using the velocity distribution, for rays connecting a set of surface cells containing shot points and receiver locations to a set of image cells in the subsurface. The user selects the size of the surface cells relative to the source and receiver spacing, and the size of the image cells relative to the desired image grid, to balance image resolution against data storage efficiency and processing speed. Each ray map file preferably contains, at a minimum, the cell-to-cell travel time, the amplitude, the KMAH index, the takeoff direction at the surface cell, and the arrival direction at the image cell, all for each individual ray path. NORSAR-3D is a commercially available ray modeling code that can calculate these quantities. The cell-to-cell travel times from the ray map files are interpolated to yield the travel time from source or receiver location to the image point for each seismic trace. The ray direction information is used to guide the interpolation. The seismic data is migrated using the interpolated travel times for each arrival at each image point, the amplitudes, and the KMAH indices. The output seismic data volume may be conveniently taken in horizontal or vertical slices for purposes of efficient parallelization of the computations. A CRAM algorithm may be used to migrate the data in common reflection angle slices. Techniques are disclosed for efficient utilization of computer resources. The invention may also be used to generate correctly migrated data in common offset volumes.

In one embodiment, the present invention is a computer-based method for controlled amplitude imaging of a target geologic formation in a subsurface region using a three-dimensional seismic data volume acquired from the subsurface region and a known velocity distribution for the subsurface region, said seismic data comprising a plurality of seismic traces, each trace having a known shot point location and a known receiver location, said method comprising the steps of: (a) discretizing into a grid of cells a three-dimensional subsurface space containing the target formation, each such image cell containing a plurality of points of a pre-selected three-dimensional image point grid, cell dimensions being chosen to balance data storage requirements with imaging accuracy; (b) discretizing into a grid of cells the surface above the target formation, the dimensions of such surface cells being chosen relative to shot point and receiver spacings so as to balance data storage requirements with imaging accuracy; (c) computing ray map files from the velocity distribution information, said files representing all physically significant ray paths connecting a representative point in a surface cell to a representative point in an image cell, using a velocity distribution for the subsurface region to determine the ray paths, said ray map files containing at least the surface cell to image cell travel time, the takeoff direction at each surface cell and the arrival direction at each image cell, said directions being specified in three-dimensional space; (d) repeating step (c) for each surface cell and each image cell; (e) storing the ray map files in computer memory; (f) interpolating travel times from the ray map files, said interpolated times being times from the particular shot point and receiver locations associated with one seismic data trace down to each point on the image point grid for each said physically significant ray path connecting same, said interpolation comprising (i) interpolating a surface cell representative point near each said particular shot point location and each said particular receiver point location, and (ii) interpolating an image cell representative point near said each point on the image grid, wherein said interpolations are implemented using the ray direction information in the corresponding ray map file in order to ensure that interpolation is made between points on the same branch of the travel time surface; (g) repeating step (f) for each trace in the seismic data volume; and (h) migrating the seismic data using the interpolated travel times and the ray amplitudes.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention and its advantages will be better understood by referring to the following detailed description in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

In some embodiments, the present inventive method combines the following features:

Multipath imaging
Common reflection angle seismic output
Amplitudes corrected for spherical divergence
Target-oriented imaging
Reading the data sequentially from the input disk file while holding ray maps in cache.

The result is a computer-assisted method capable of routine controlled amplitude imaging for full 3-D data sets.

Figure 1:
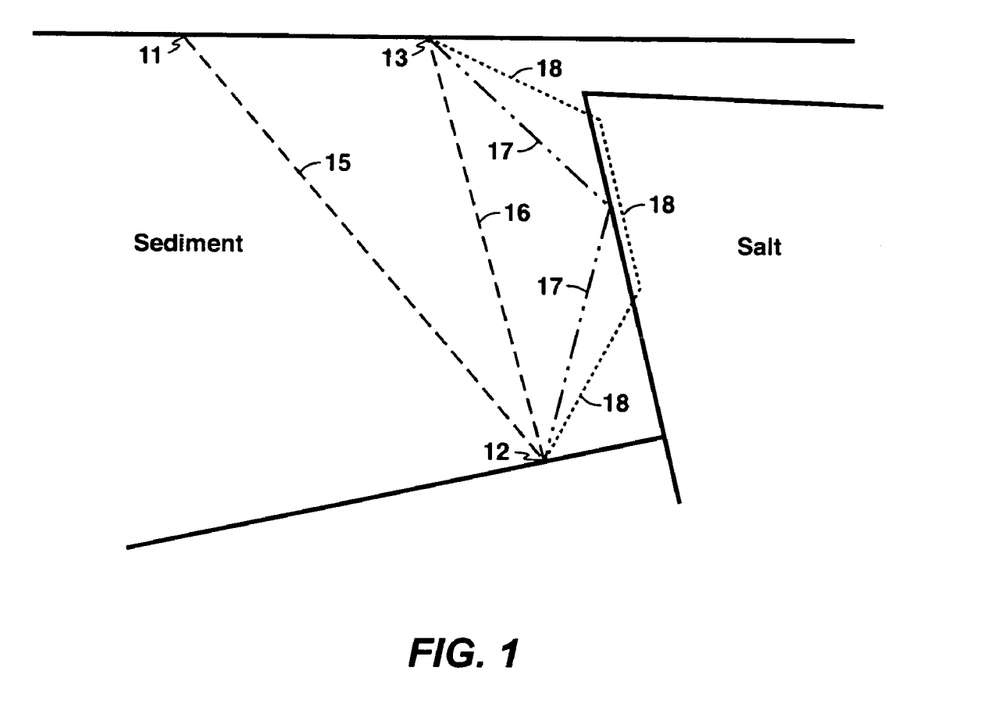
FIG. 1 is a sketch of multipath rays near a salt mass.

A basic mechanism of multipathing is sketched in FIG. 1. The ray paths illustrated would be contributors to an image at image point 12. It is known on theoretical grounds that the most important contributors will be those that are closest to specular reflection at the image point for the given source and receiver locations. Illustrated are a single direct ray 15 connecting an image point 12 on a target reflector to a receiver 11 at the surface, and a set of three ray paths connecting the image point to the source point 13 at the surface. The three ray paths are: a direct ray 16, a ray 17 reflected from the salt, and a ray 18 refracted through the salt. Conventional Kirchhoff imaging would typically select the direct ray 16 to form the image because it has the shortest travel time and the largest amplitude. However in this particular configuration reflected ray 17 is more important since it is close to being perfectly reflected from the target reflector.

Figure 2:
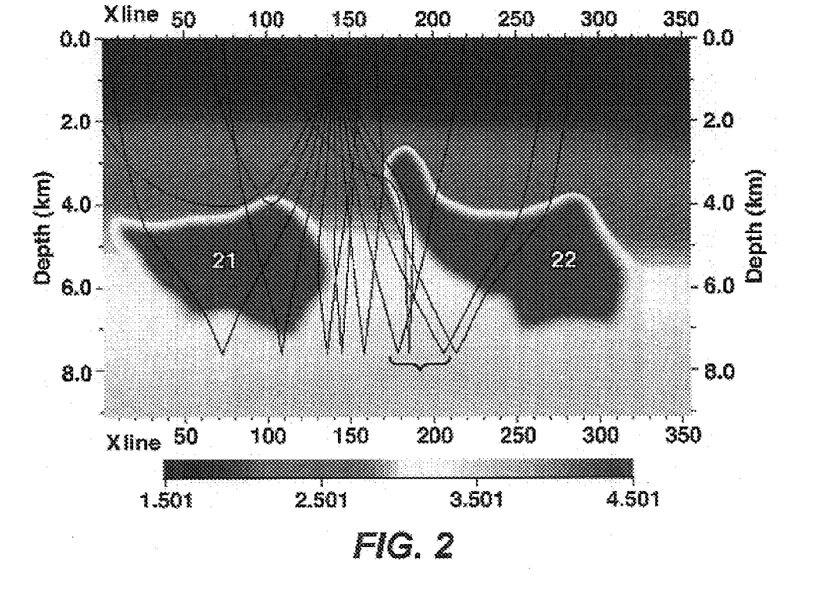
FIG. 2 is a computer-generated set of ray paths from a single shot point in a complex formation where propagation velocity is indicated by color.

Multipathing is illustrated for a realistic velocity model in FIG. 2, which shows simulated ray paths all from a single shot point (No. 141) in a subsurface structure exhibiting a large range of acoustic wave velocity variation. Velocity is represented by color as quantified in km/s by the color bar. The regions of highest velocity, designated 21 and 22 and shown in red, are salt deposits. A ray path is completely determined by the angle with which it leaves the shot point and the velocity distribution throughout the medium in which it travels. Similarly, the travel time for seismic energy to move along a ray path can be computed knowing the velocity distribution. The multipath phenomenon is illustrated by comparing three ray paths bracketed in FIG. 2. The first reflects at a cross-line position of about 185 and travels back up to a receiver positioned at about 106. This path should be compared to the two more conventional ray paths bracketing image position 185, and reaching detectors at positions 219 and 270. These suggest a similar ray path that, although not shown, would reflect at image position 185 just like the first ray path mentioned, but traveling a much different path.

Figure 3:
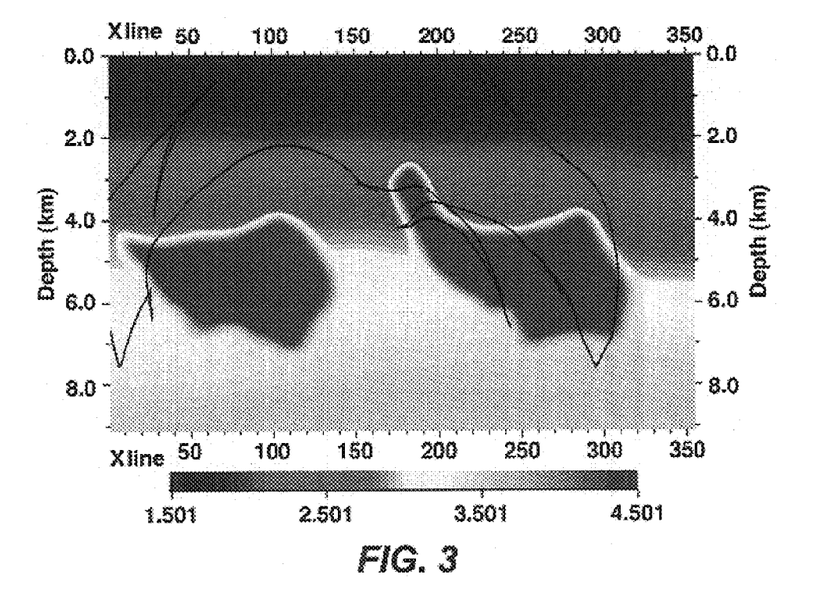
FIG. 3 illustrates, at an instant of time, the wave front originating from the same shotpoint as in FIG. 2.

FIG. 3 shows the same subsurface structure, with wavefronts shown by the black lines. It illustrates that after reflection by a hypothetical reflector at a depth of 7300 meters the wavefront has developed several "bow-ties" each of which contains multipath energy and which requires a multipath imaging code to be properly imaged.

What is desired is to image a seismic data set so that the reflectors are clearly positioned at the correct depths, and not blurred due to multipath arrivals at the same image point at different times. Persons skilled in the art will understand that the desired imaging can be performed if the following quantities are known: travel time, amplitude, phase and initial ray direction. The amplitude referred to is not the seismic data amplitude, but instead a measure of the relative amount of energy taking a particular ray path. The amplitude for one ray path compared to another will depend on the respective path lengths and the media they traverse. In a uniform medium, the amplitude for a given ray path can be taken as the reciprocal of the path length between the image point and either the source or receiver location, as the case may be.

However, the total volume of pre-computed maps of travel time, amplitude, phase, and ray direction needed for 3-D migration is very large and would require upwards of 100 Terabytes of computer storage for a typical 3-D seismic dataset. The present invention solves this problem by interpolating the maps from a coarse grid onto a more refined grid during the migration process. The maps are built on coarse-grained surface and image grids. In preferred embodiments of the present invention, each output map contains, at a minimum, the travel time, ray amplitude, KMAH index (needed to obtain the correct phase in multipath imaging) as well as the three direction cosines (or equivalent directional measures) for a particular ray at both the surface and image point (i.e. the takeoff direction at the surface cell and the arrival direction at the image cell). It would be possible to produce an image using less of the ray information. For example the KMAH index might not be used. However this would in most cases result in an inferior image. As another example, the present inventive method can be used without the ray-path amplitudes.

Map construction may be performed, for example, by the commercially available (web site www.norsar.com) ray modeling code, NORSAR-3D, which can compute all of the above-named parameters needed for a ray map. A given cell in the surface coarse grid may be connected to a given cell in the image coarse grid by zero, one or multiple ray paths. Some of a group of multiple ray paths may be physically insignificant from the standpoint of the relative amount of energy that will propagate along them. Those paths with amplitudes below a user-supplied threshold may be ignored for computational efficiency. Subject to that constraint, a ray map (30 in the flow chart of FIG. 4) is constructed for every ray path and for every surface cell (or every cell that contains a source point or receiver location of interest) and every image cell (within the desired target volume). Map construction is step 31 in the flow chart, which illustrates an embodiment of the invention in which NORSAR-3D is used.

The ray maps are stored on computer disks. Because the maps pertain to the coarse-grained grids, they occupy on the order of hundreds of Gigabytes of storage compared to the one hundred or more Terabytes that would be required if the surface and image regions were not discretized into cells. In preferred embodiments of the invention, the maps are pre-processed (at step 33 in FIG. 4) to incorporate the target image region 32, to confirm the surface source locations, and to provide statistical information useful for migration such as maximum map size and the range of amplitudes in the ray data. An auxiliary file 34 may be generated which contains a table of the disk locations for the start of each depth level of each map.

Figure 4:
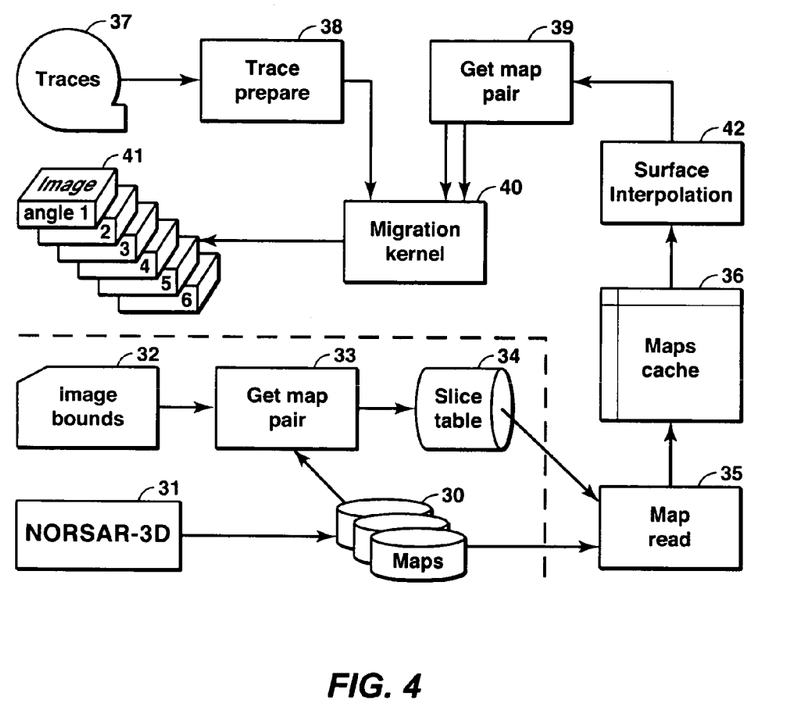
FIG. 4 is a flow chart illustrating steps in one embodiment of the present inventive method.

The preceding actions are in preparation for migrating (imaging) the seismic data. The boxes below and to the left of the dashed lines in FIG. 4 are intended to represent these preliminary steps in the embodiment of the invention illustrated in that drawing. The rest of FIG. 4 represents the data migration steps. During map reading 35 in the migration process, indices are preferably constructed to allow compact storage and efficient retrieval of multipath ray data. For each point in the image, the indices may contain, for example, the number of rays to that point and the position of the first such ray in a list of all the rays for the map. This method is compact because it stores information only for actual rays without allocating extra space for possible multiple rays that frequently are not present. Efficiency is achieved using an index instead of searching the list for specific x, y, z coordinates. These indices can be similar in size to the lists themselves, and are therefore not pre-computed.

In the embodiment of the invention in which NORSAR-3D maps are used, a significant speedup can be achieved during the reading of maps (at steps 33 and 35 in FIG. 4). Instead of using the vendor-supplied routine to retrieve data for a single ray, all the ray data for a map can be flexibly and efficiently retrieved directly from the input buffer through suitable array index construction and careful looping. Thus, data for many rays are retrieved in a single subroutine call, rather than making a separate call for each ray.

The image is built from cells which are specified on the coarse subsurface grid which may be sized (for example) 4×4×8 relative to the final refined image grid in the x, y, z directions respectively. Each cell is labeled with the amplitudes, KMAH indices, and the surface and image point dip values deduced from ray tracing onto the coarse grid. This enables linear interpolation of travel times using the dip information "on the fly" for both surface and image points. Separate interpolations are done at each end of each ray, i.e., in the surface cell region and also in the image cell region. For example, each cell will have a representative point, which may or may not be the geometrical center of the cell. Preferably, the representative point is chosen to coincide with a point in the fine-scale grid. For a given trace, the travel time from a relevant ray map is the time from the representative point in a surface cell to the representative point in an image cell. Interpolation is used to adjust the cell-to-cell travel time for a particular ray path to the precise locations within the cells for the shot point (or receiver) and the image point. In some embodiments of this invention, this is done by stepping out from the cell's representative point.

Figure 5A:
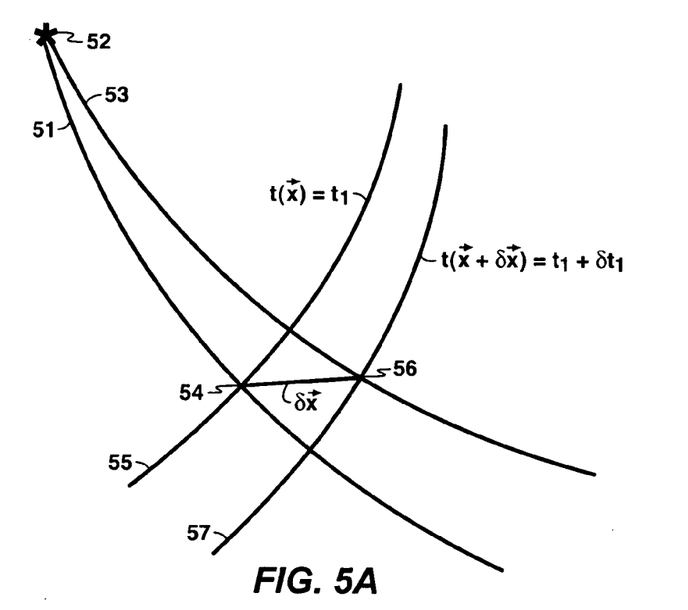
FIG. 5A illustrates the interpolation process in one embodiment of the present inventive method.

FIG. 5A illustrates how the interpolation is performed in the travel time maps in one embodiment of the invention. The figure is drawn in two dimensions for simplicity and clarity; however the same logic applies in three dimensions. Consider two possible ray paths 51 and 53 connecting surface point 52 to image points 54 and 56 respectively and which lie on wave fronts 55 and 57 respectively. Wave fronts 55 and 57 propagate in the direction of the ray paths, characterized by the fact that every point on a wave front has the same travel time from source point 52. The wave fronts are spherical in a uniform (constant velocity) medium. FIG. 3 shows what the wave fronts for the different ray paths can look like in a realistic medium. Consider the travel time from surface point 52 to image point 56 on the fine grid being separated from point 54 on the coarse grid by a distance $\vec{\delta x}$. The difference in travel times between the two wavefronts $\delta t_1$ can be found by linear extrapolation from point 54 using the gradient of traveltime surface 55 at point 54. This applies irrespective of whether the traveltime surface is single-pathed or multipathed as long as points 54 and 56 lie on the same branch of the traveltime surface. In FIG. 3, for example, this means that the points must lie on the same arc of the wavefront not separated by a cusp.

Figure 5B:
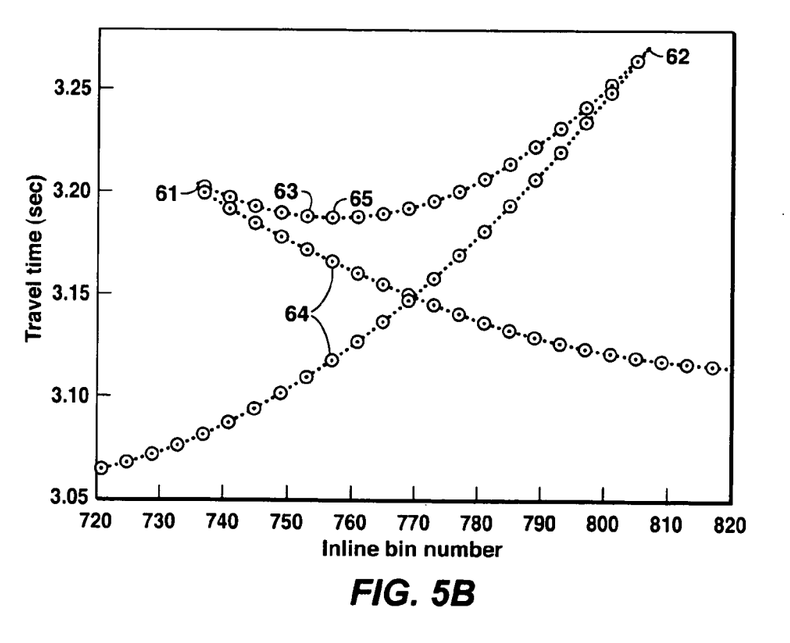
FIG. 5B illustrates the different branches of the traveltime surface caused by multipathing.

FIG. 5B illustrates the phenomenon of multipathing for a real seismic data set in the Gulf of Mexico. This is a 2-D slice through a 3-D multi-branched surface in 3-D space. The depicted wave front is separated into three branches by cusps 61 and 62. If conventional methods are used, an attempt to interpolate the travel times illustrated in the figure will typically result in interpolation between different branches. For example an attempt at interpolation between coarse grid points (denoted by circles) 63 and 65 will actually interpolate between 63 and any of 64 or 65 (the next inline bin number), which would result in unacceptable error. The present inventive method solves this problem by extrapolating from the coarse grid points using the dip information stored for each coarse grid point. The dots between the circles illustrate successful interpolation by such method, i.e., by avoiding mixing the different branches of the travel-time plot. As previously noted, in 3D seismic processing, the travel times form complex multi-branched surfaces in 3D space. The present inventive method is applicable to either 2D or 3D situations.

A preferred linear interpolation equation is:

$$\delta t = \vec{t}(\vec{x}+\vec{\delta x}) - t(\vec{x}) = \vec{p}\cdot\vec{\delta x}$$

where $\delta t$ is a small change in travel time, $\vec{\delta x}$ is an arbitrary small displacement in 3-D space, and $\vec{p}$ is the dip vector at the point $\vec{x}$ and is equal to the gradient of the wavefront. Since the ray direction and seismic velocity are known at each image point, the dip is also determined. (The dip vector is a vector in the direction of the ray with magnitude 1/v, where v is the velocity at the point in question). Interpolation within the surface cell (indicated at 42 in FIG. 4) is not illustrated in FIG. 5 but the concept is the same.

In some embodiments of the invention, there is also a caching scheme (indicated at 36 in FIG. 4) for reading maps from disk, so that orderly access of shot-ordered data can minimize the re-reading of maps from disk. The net effect of this program structure is that the maps are effectively held in cache during most of the run while the data is read sequentially, each trace being accessed once only.

Each seismic trace 37 is read once into working memory at step 38. Step 38 may include computation of filtered traces for anti-aliasing in the kernel and computation of Hilbert transforms of the traces required when the KMAH index is non-zero. Knowledge of the ray angles enables anti-alias filtering to be performed both for data and operator anti-aliasing. A method that may be used is a generalization of that by Gray ("Frequency-selective design of the Kirchhoff migration operator", *Geophysical Prospecting* 40, 565–571 (1992)). The correct filtered version of the trace contributing to each image point is selected (via a pre-computed table of filter indices) from an array of filtered traces pre-computed when the trace is read.

For each trace the source and receiver locations are known. For each image point desired, the relevant maps are accessed (39) so that the takeoff angles at the surface and arrival angles at the image point are available for all rays connecting the source and receiver to the image point. Maps are accessed in pairs in this embodiment, one map for the source-to-image point ray and the other for the image point-to-receiver ray. It will be obvious to a person skilled in the art that due to reciprocity considerations, the ray map for a ray beginning at a certain surface cell and ending at a certain image cell will contain the same information as a ray map beginning at that image cell and following the same path in the reverse direction to the same surface cell. Thus, only a single ray map is required for each source-image point and image point-receiver path. The arrival angles at the image point enable the reflection angle to be determined, and thus the migrated trace data can be placed in the appropriate angle bin 41. (In the embodiment of the invention illustrated in FIG. 4, migration—box 40—is performed with a CRAM algorithm.) After migrating all of the data there will be one common angle volume 41 for each angle bin. In the particular embodiment of the invention illustrated in FIG. 4, image cell interpolation is performed in the migration kernel 40. In this manner, the migration process makes a different travel time correction for each different path in a multipath group of paths, thereby imaging a single reflector point.

A brief flow description for the migration kernel 40 would be as follows in one embodiment of the invention, although persons skilled in the art will know of many variations. The seismic trace data, after filtering 38, are input to the kernel, as are the filtered Hilbert transforms of the seismic traces, indexed by filter. Then, the following is performed for each plane of image cells: A computer loop is performed over the x-y image plane on the selected coarse grid. Within the x-y loop, a loop is performed over multiple arrivals from the source location and from the receiver location. For each step in the two loops, the dip angle and the reflection angle are deduced using the maps. A check is performed to determine if the dip angle is within a pre-selected angular aperture, and the reflection angle is within a pre-selected angle range; if not, the data is discarded. The travel times for the source and receiver one-way rays are summed, and that sum is checked against a pre-set limit, with data for times longer than the limit being discarded. The one-way travel times are interpolated, as noted previously, both in the subsurface image cell and on the surface using the dip information contained in the map files. An anti-alias filter index is selected using surface and image point dip information from the ray maps. The KMAH indices are summed for the source-image point and image point-receiver ray so that the overall phase is determined. The exact phase angle used is $-\pi/2$ multiplied by the total KMAH index. The KMAH index is used to select (using a pre-computed table) the correct phase-shifted version (also pre-computed) of the input trace. KMAH indices are described by Chapman and Drummond, "Body-Wave seismograms in inhomogeneous media using Maslov asymptotic theory", *Bulletin of the Seismological Society of America,* 72, S277–S317 (1982). As used herein, KMAH index includes any other way of expressing or capturing equivalent information.

A controlled amplitude weight is computed, and a weight for proportional contribution to each adjacent angle bin is computed. At this stage all the parameters necessary to characterize a given image cell have been determined. Within a given image cell, the travel time is linearly interpolated to all points of the cell volume. A computer loop is performed over x-y-z points on a refined image grid within an image cell. At each point within that loop, the relative time-shift within the cell is computed using dip information from the coarse grid ray maps, and a weighted time-shifted output is computed using phase and filter indices for each location within the image cell. Efficiency in memory access may be enhanced by storing all the image points for an image cell in a contiguous block, horizontally slicing the image blocks into individual depth levels only when finally writing to disk.

This description of the migration step is a brief summary. Many aspects that are mentioned are standard processing steps that will be familiar to the person skilled in the art. Those that are not are explained more fully elsewhere herein.

Speedup through use of multiple processors may be readily achieved by partitioning the output image space into slices in any of the principal axis directions. Each slice contains one or more planes of the output 3-D seismic image. Embodiments in which the partitioning consists of depth ranges have already been discussed. As another example, each processor can be assigned a set of one or more seismic inlines. Each processor reads all the traces, but uses only the portion of the maps corresponding with its partition of the output image, i.e., only corresponding segments of the maps are distributed to each processor's local disk or memory.

In one embodiment that utilizes a large number of processors clustered together, the seismic trace data are partitioned according to the number of processors, so that each processor handles one partition of the data stored on its local disk. The partitioning is determined in such a way as to provide "load balancing", the allocation of approximately equal amounts of work to each processor. The output image is computed by inlines (or crosslines), one or several at a time depending on processor memory constraints, each processor creating a portion of the image resulting from its partition of the trace data. Final angle bin images for a set of inlines or crosslines are created by summing the contributions from each processor before proceeding to the next set of lines.

Handling of the map data for this alternative "cluster" embodiment involves splitting each map into pieces corresponding to the sets of inlines or crosslines to be processed, and broadcasting these pieces to local disk on each of the processors. In this embodiment, the map pieces for a set of lines are re-assembled into one or several groups, thus allowing the convenient and efficient broadcast of a few reasonably large map files rather than thousands of small files. A person skilled in the art will readily be able to develop software for writing and reading of map files containing NORSAR-3D maps from multiple shots especially for this purpose. It is also useful for preliminary image studies to compute output images for a selected subset of inlines or crosslines.

In some embodiments of the invention, for each image point and for each ray connecting the source and receiver to the image point, the ray takeoff and arrival angles are accessed from the maps so that the reflection and dip angles (respectively α and θ) are determined through the equations:

$$\cos(2\alpha) = \hat{n}_1 \cdot \hat{n}_2$$

$$\cos\theta = \frac{(n_{1z} + n_{2z})}{2\cos\alpha}$$

where $\hat{n}_1$ and $\hat{n}_2$ are unit vectors specifying the dip (ray direction) at the image point of the source and receiver rays respectively. In this instance, the dip angle is the angle that the ray makes relative to the vertical direction. The reflection angle is needed when a CRAM algorithm is used to migrate the data. It is often desirable to reject data associated with large dip angles.

In some embodiments of the invention, the amplitude of each ray is accessed so that the weight factor required for seismic amplitude preservation is determined through the equation:

$$\text{weight} = n_{1z} n_{2z} v A_1 A_2$$

where $A_1$ and $A_2$ are the ray amplitudes for the source-image point and receiver-image point rays, and v is the image point velocity.

Figure 6:
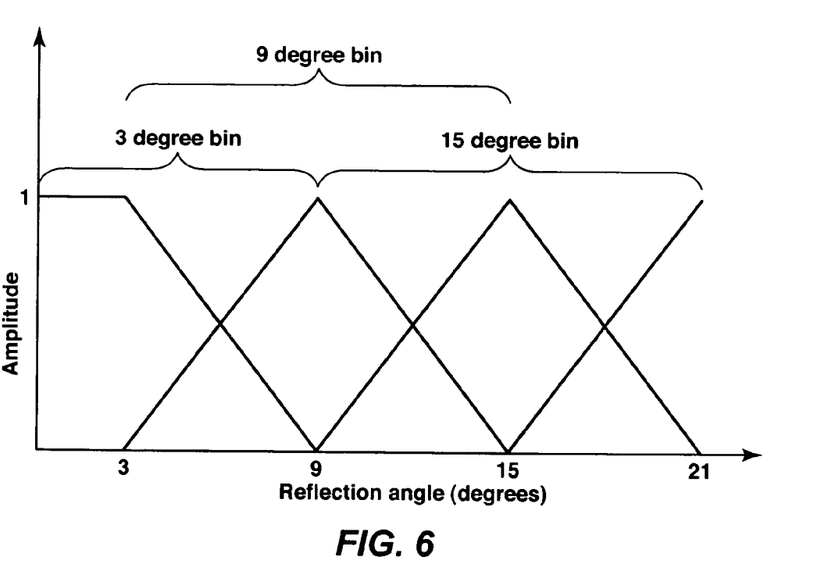
FIG. 6 illustrates a method of subdividing angle bins.

The trace has now been time-shifted by the migration process. The weighted, time shifted trace is added into the image for the appropriate angle bin. Migration artifacts are avoided by use of overlapping angle bins as illustrated in FIG. 6. Each trace then contributes to two adjacent angle bins each with an appropriate pre-tabulated weight. The completed image partitions are re-assembled into a final output image volume for each angle bin.

The data may be sorted into angle gathers. A gather is conventionally considered "flat" when a given seismic event appears at a fixed depth for available angle bins. By checking the flatness of these gathers one has a measure of the accuracy of the velocity model. By modifying the velocity model and retracing rays one may attempt to improve the flatness of the gathers and obtain a better image in a further migration of the data.

The seismic data offset (source-receiver spacing) may be noted within the migration kernel and the migrated data may be output into common offset volumes. Alternatively, if the seismic data traces that are input into a CRAM algorithm all share a single common offset and a single angle bin covering all of the expected range of reflection angles is used, the output of the present inventive method will be a common offset seismic data volume in which multipathing has been correctly accounted for. In this case, the reflection angle does not need to be computed within the CRAM kernel. Such common offset seismic volumes may be convenient in some instances, for example in interfacing with existing velocity model software that is adapted to common offset data. Such software often deals with offset gathers rather than angle gathers.

The degree to which the surface and image regions are coarse-grained, or discretized into a grid of cells, is a key to the invention. The coarse grids are a major factor in making CRAM workable in three dimensions in a complex formation exhibiting a lot of multipathing. If the cells are too large, the interpolation will be unreliable and image accuracy will suffer. If the cells are too small, data storage requirements may be excessive, and the migration algorithm speed will generally decrease. There is no one correct answer or range of coarseness. The best cell size will depend on the user's balance of the competing considerations. The inventors have found that a useful rule of thumb is that a ratio of cell size to the fine grid (source/receiver spacings for the surface and desired image grid) in the range of not more than 4 by 6 by 8 and not less than 3 by 4 by 8 gives good results. However these numbers could change for extremely complex velocity models. (The numbers refer respectively to surface x and y, image x and y, and image z dimensions.) No surface z dimension is suggested because in many applications, including all marine applications, the surface will be sufficiently flat, and all source and receiver locations for all practical purposes in the same plane, that the surface cells may be 2-D rectangles. This may not be true, however, for land applications in hilly terrain, and therefore the present invention is not limited to 2-D surface cells.

EXAMPLE

Figure 7A:
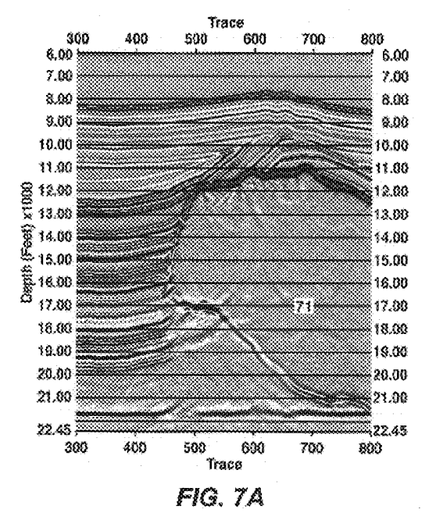
FIG. 7A shows the results of imaging under a salt mass using conventional techniques that do not account for multipathing.
Figure 7B:
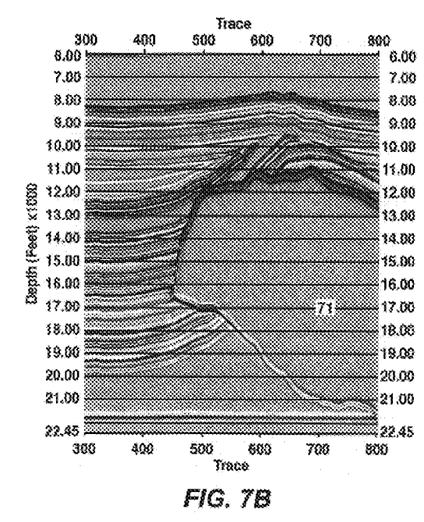
FIG. 7B shows the same formation imaged using the present inventive method with a CRAM algorithm.

The method is illustrated in FIGS. 7A and 7B using 2-D synthetic data. The model covers a depth range 6000–22450 ft. and both images are full stacked sections. Both images were produced using the exact velocity model that was used to generate the input seismic data. In FIG. 7A, produced by stacking Kirchhoff common offset images as described previously, it can be seen that conventional techniques that do not properly account for multipathing produce reflector images that are poor under the salt mass 71 at the right, i.e., below 17,000 feet and for trace number above 450. On the other hand, in FIG. 7B, generated by the present inventive method using a CRAM algorithm, the reflectors can be followed under the salt mass. Also in FIG. 7B the salt boundary is better imaged and there is a better signal to noise ratio. These are all effects that one would expect from a successful multipath imaging method which should be able to focus more of the energy in the seismic data than could a single path method.

Figure 8:
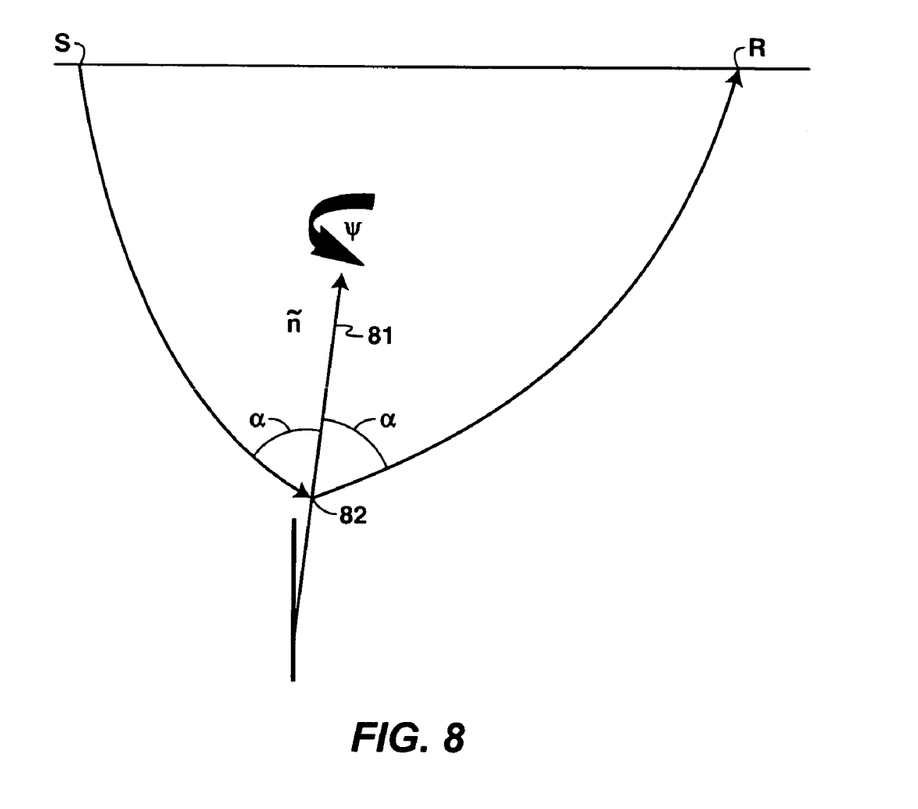
FIG. 8 illustrates the geometry for Common Reflection Angle Migration (CRAM)
Figure 9A:
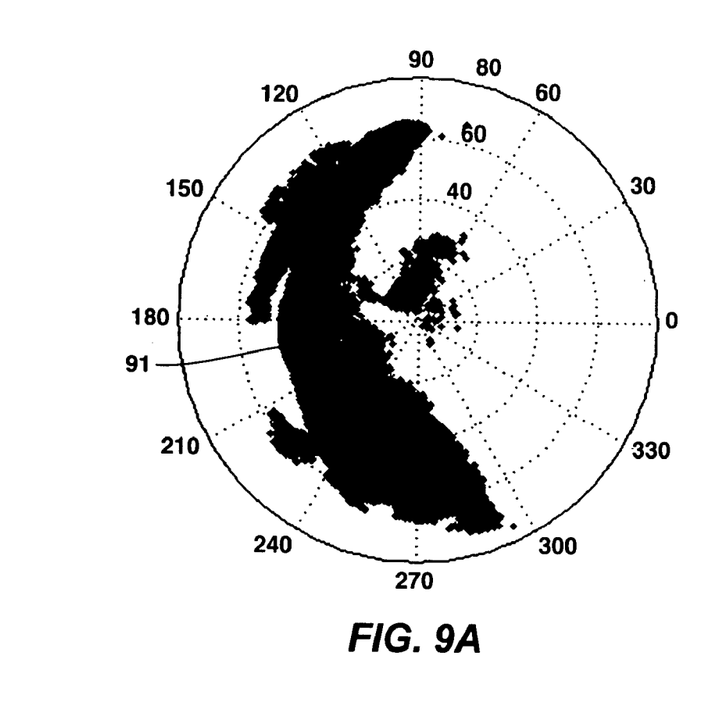
FIGS. 9A and 9B illustrate sub-salt illumination in terms of dip direction in 3-dimensional space in order to assess reliability of a particular reflector image point.
Figure 9B:
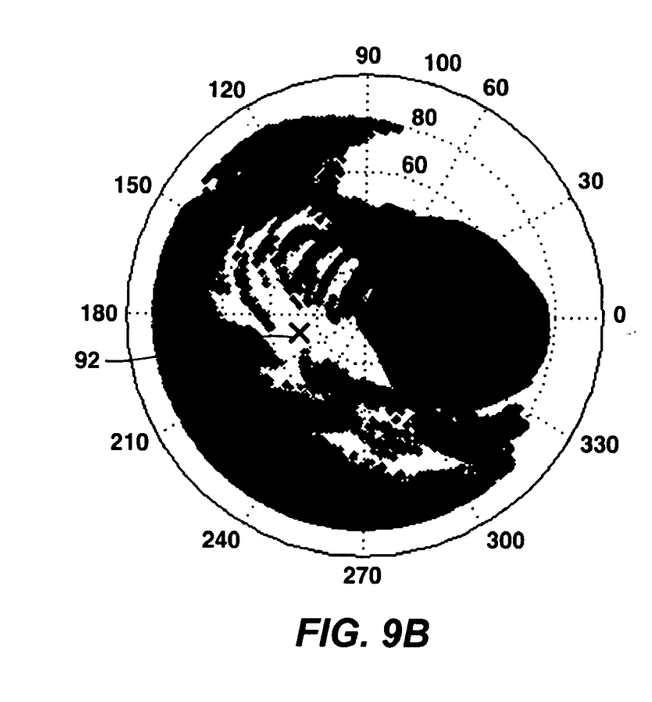

The reliability of a given CRAM 3D volume may be assessed by the following technique. Given the velocity model, ray maps and seismic data, CRAM is run for one or more image points of interest, but instead of outputting a seismic volume, the computed dip angles and reflection angle at each selected image point, for example, are output. In FIG. 8, the vector 81 (denoted by ñ) represents the normal to the reflecting surface at image point 82. The direction of the normal vector 81, as measured by a polar angle θ (not shown) and an azimuthal angle φ (not shown), is taken to be the dip direction at the particular image point. The components of dip vector 81 are:

$\tilde{n}_x = \sin\theta \cos\phi$ $\tilde{n}_y = \sin\theta \sin\phi$ $\tilde{n}_z = \cos\theta$ The angle ψ around the rotation axis defined by ñ determines the orientation of the plane defined by the rays at the image point. In forming the seismic image the angle ψ is usually summed over, which can be accomplished by ignoring it in the kernel. However, if ψ is computed in the kernel, it is also possible to produce seismic volumes that depend on both ψ and the reflection angle α. The source is at S, and the receiver is at R. The set of all dip vectors ñ, as illustrated in FIG. 8, may be plotted on a polar plot, with θ the co-latitude and φ the longitude, as shown in FIGS. 9A and 9B. In order for the dip of the imaged reflector to be possible at the given image point, the imaged dip must fall within a region of dips actually populated by the data. FIGS. 9A and 9B illustrate an example of this taken from a real 3D seismic survey. With illumination as shown in FIG. 9A, the imaged reflector dip 91 has a dip consistent with the data and ray maps, i.e., it falls within the illuminated (shaded) area. With illumination as shown in FIG. 9B, the imaged reflector dip 92 has a dip inconsistent with the data and ray maps.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

We claim:

1. A computer-based method for controlled amplitude imaging of a target geologic formation in a subsurface region using a three-dimensional seismic data volume acquired from the subsurface region and a known velocity distribution for the subsurface region, said seismic data comprising a plurality of seismic traces, each trace having a known shot point location and a known receiver location, said method comprising the steps of:

(a) discretizing into a grid of cells a three-dimensional subsurface space containing the target formation, each such image cell containing a plurality of points of a pre-selected three-dimensional image point grid, cell dimensions being chosen to balance data storage requirements with imaging accuracy;

(b) discretizing into a grid of cells the surface above the target formation, the dimensions of such surface cells being chosen relative to shot point and receiver spacings so as to balance data storage requirements with imaging accuracy;

(c) computing ray map files from the velocity distribution information, said files representing all physically significant ray paths connecting a representative point in a surface cell to a representative point in an image cell, using a velocity distribution for the subsurface region to determine the ray paths, said ray map files containing at least the surface cell to image cell travel time, the takeoff direction at each surface cell and the arrival direction at each image cell, said directions being specified in three-dimensional space;

(d) repeating step (c) for each surface cell and each image cell;

(e) storing the ray map files in computer memory;

(f) interpolating travel times from the ray map files, said interpolated times being times from the particular shot point and receiver locations associated with one seismic data trace down to each point on the image point grid for each said physically significant ray path connecting same, said interpolation comprising:

interpolating a surface cell representative point near each said particular shot point location and each said particular receiver point location;

and interpolating an image cell representative point near said each point on the image grid;

wherein said interpolations are implemented using the ray direction information in the corresponding ray map file in order to ensure that interpolation is made between points on the same branch of the travel time surface;

(g) repeating step (f) for each trace in the seismic data volume; and (h) migrating the seismic data using the interpolated travel times and the ray amplitudes.

2. The method of claim 1, wherein each ray map in computer memory is constructed in the form of a compact list of rays efficiently accessed through an index constructed when the map is read from disk.

3. The method of claim 1, wherein the interpolation step (f) uses the equation $$\delta t = \vec{t}(\vec{x} + \vec{\delta x}) - t(\vec{x})\vec{p} \cdot \vec{\delta x}$$

where $\delta t$ is a small change in travel time, $\vec{\delta x}$ is an arbitrary small displacement in 3-D space, and $\vec{p}$ is the dip vector at the point $\vec{x}$.

4. The method of claim 1, wherein the ray map files also contain the relative amplitude of each ray path, and a ray path is physically significant if its associated amplitude is greater than a pre-set value.

5. The method of claim 1, wherein said three-dimensional subsurface space containing the target formation is partitioned into slices, the slices being perpendicular to one of the x-y-z coordinate axes, each slice being assigned to a different processor, and corresponding segments of the ray maps being distributed to each processor's local memory.

6. The method of claim 5, wherein the slices are depth ranges.

7. The method of claim 5, wherein the slices are sets of inlines.

8. The method of claim 5, wherein the slices are sets of crosslines.

9. The method of claim 1, wherein the takeoff and arrival direction information in the ray map files are the three direction cosines for an orthogonal Cartesian coordinate (x, y, z) system.

10. The method of claim 1, wherein the data for the ray map files are computed using the software product NOR-SAR-3D.

11. The method of claim 10, wherein the ray map files produced by the NORSAR-3D software are examined to extract statistical data and information concerning the location within the files of data for specific target regions.

12. The method of claim 1, wherein the arrival angles at the image point are determined for each trace, and the traces are partitioned into common reflection angle bins, and a Common Reflection Angle Migration algorithm is used to migrate the seismic data by bin.

13. The method of claim 12, wherein the reflection angle $\alpha$ is determined from the equation $\cos(2\alpha) = \hat{n}_1 \cdot \hat{n}_2$ where $\hat{n}_1$ and $\hat{n}_2$ are unit vectors specifying the dip (ray direction) at the image point of the source and receiver rays respectively.

14. The method of claim 1, wherein the ratios of the cell sizes relative to the finer grid of image points and source/receiver spacings are not more than $4^2$ by $6^2$ by 8 and not less than $3^2$ by $4^2$ by 8, said numbers referring respectively to surface x and y, image x and y, and image z dimensions.

15. The method of claim 1, wherein all the seismic traces have a common offset.

16. The method of claim 1, wherein a pre-computed table of filter indices is used to select from an array of filtered traces, depending on surface and subsurface dips.

17. The method of claim 1, wherein the image points for an image cell are stored in a contiguous block, said blocks being later horizontally sliced into individual depth levels.

18. The method of claim 1, wherein the KMAH index is also computed, stored in the ray map files, and used in the migrating step.

19. The method of claim 1, wherein computed ray path amplitudes are used to compute weight factors to preserve seismic amplitudes in the migrating step.

20. The method of claim 1, further comprising apportioning the seismic data traces in the seismic data volume to a plurality of different computer processors to perform said controlled amplitude imaging method, and then summing completed contributions from said different processors to form an output image.

21. The method of claim 20, wherein said output image is computed for a preselected subset of inline or crossline planes.

22. The method of claim 20, wherein the data for the ray map files are computed using the software product NOR-SAR-3D and only map data corresponding to sets of inline or crossline planes are extracted from the full maps and broadcast to said plurality of processors.

23. The method of claim 10, further comprising reading ray map data for a plurality of rays in a single subroutine call directly from an input buffer in order to perform said interpolating travel times steps.

24. The method of claim 1, further comprising assessing reliability of said migrated seismic data using computed dip angles and reflection angles from the ray-map files for selected image points, wherein dip direction of each selected image point is plotted on a polar plot, and said plotted points are compared to dip regions of said polar plot that are populated by said seismic data.

25. The method of claim 1, wherein the ray-map files also contain the relative amplitude of each ray path.

* * * * *